United States Patent [19]

Ohishi

[11] Patent Number: 5,566,791
[45] Date of Patent: Oct. 22, 1996

[54] DISC BRAKE

[75] Inventor: Hidenori Ohishi, Itami, Japan

[73] Assignee: Sumitomo Electric Industries, Ltd., Osaka, Japan

[21] Appl. No.: 550,111

[22] Filed: Oct. 30, 1995

[30] Foreign Application Priority Data

Oct. 31, 1994 [JP] Japan .................................. 6-266847

[51] Int. Cl.$^6$ .................................................. F16D 65/095
[52] U.S. Cl. ...................................... 188/73.39; 188/73.46
[58] Field of Search .......................... 188/73.1, 73.31, 188/73.39, 73.46, 250 B, 250 D, 250 E, 250 G; 403/345, 354, 364, 375

[56] References Cited

U.S. PATENT DOCUMENTS 4,220,224  9/1980  Karasudani ........................... 188/73.39
5,125,482  6/1992  Negishi .................................. 188/73.39

FOREIGN PATENT DOCUMENTS 2221273  1/1990  United Kingdom ................... 403/364

Primary Examiner—Robert J. Oberleitner
Assistant Examiner—Chris Schwartz
Attorney, Agent, or Firm—Wenderoth, Lind & Ponack

[57] ABSTRACT

A disc brake has a torque-carrying plate having a thickness substantially smaller than conventional plates, and yet is capable of carrying brake torque stably from the time the inner pad is brand-new until it is completely worn out. The torque-carrying plate has a plurality of protrusions extending in the axial direction of the disc so that its torque-carrying surface has a larger width than the thickness of the plate. The zigzag-shaped torque-carrying surface is symmetrical with respect to its longitudinal centerline so that the point at which the torque acts will be kept on the longitudinal center. Such a torque-carrying plate is easy to manufacture, light in weight, inexpensive, and can stabilize the braking effect of the disc brake.

4 Claims, 2 Drawing Sheets

DISC BRAKE

BACKGROUND OF THE INVENTION

The present invention relates to a disc brake including a torque-carrying plate having a torque-carrying surface of improved design so that it can support an inner pad stably until it is completely worn out even if the torque-carrying plate is thinner than conventional plates.

Known floating-caliper type disc brakes include one type in which its inner pad, biased by a brake piston, is in abutment with a fixed torque-carrying plate so that the brake torque applied to the inner pad is carried on the torque-carrying plate, whereas the outer pad is fixed to the outer portion of the caliper so that the brake torque applied to the outer pad is carried on the caliper.

In this type of disc brake, if at the start of use of the pad the entire torque-transmission surface formed on the backing plate of the inner pad is in contact with the torque-carrying surface (if not, that is, if the torque is transmitted not through the entire torque-transmission surface but only through part of it, the torque-carrying surface and the torque-transmission surface tend to be damaged), the width (in the axial direction of the disc) of the torque-carrying surface of the torque-carrying plate has to be determined by taking into account the sliding amount of the inner pad when it is completely worn out. Otherwise, when the inner pad has been completely worn out, it will come off of the torque-carrying plate, so that a large load will act on pad pins which support the pads so as to be slidable in the axial direction of the disc. If the inner pad is supported on the torque-carrying plate, it will drop off, so that the disc brake will completely lose its braking function.

For the above reasons, the torque-carrying plate has to be sufficiently thick so that it can support even a pad that has been completely worn out.

Such a torque-carrying plate is formed by blanking a steel plate because blanking is better in terms of mass-productivity than casting. The thinner the blanked plate, the more easily it can be machined. Also, the thinner the torque-carrying plate, the smaller the total weight of the disc brake.

But in conventional disc brakes of this type, since the width of the torque-carrying surface is equal to the thickness of the torque-carrying plate, it is impossible to reduce the thickness of the plate below a certain point. Also, since thicknesses of the blanked plates tend to vary at their edges, that is, they have an inaccuracy in size, it is necessary to correct such inaccuracies by machining so that the torque-carrying surface has a sufficient width. This machining work is troublesome. The torque-carrying plates thus obtained are not light enough.

SUMMARY OF THE INVENTION

An object of the present invention is to provide a disc brake having a torque-carrying plate which is thinner than conventional such plates and yet capable of supporting the inner pad stably until it is completely worn out.

According to the present invention, there is provided a disc brake comprising a disc, a brake piston, an inner pad and an outer pad disposed opposite to each other on both sides of the disc and adapted to be brought into frictional contact with the disc, and a fixed torque-carrying plate. The inner pad abuts the torque-carrying plate when it is urged by the brake piston, the torque-carrying plate being adapted to carry brake torque applied to the inner pad. The torque-carrying plate has a torque-carrying surface of a zigzag shape comprising a plurality of protrusions extending in the axial direction of the disc so as to increase the width of the torque-carrying surface to such an extent that the inner pad can be supported on the torque-carrying surface even when the inner pad has been completely worn out. The torque-carrying surface is symmetrical with respect to a longitudinal centerline of the torque-carrying surface.

The torque-carrying surface formed with protrusions so that it has a zigzag configuration has a width W (in the axial direction of the disc) larger than the thickness w of the plate itself. Thus, it is possible to reduce the thickness of the torque-carrying plate compared with conventional plates. Such a plate can be formed easily by blanking. A disc brake using such a thin torque-carrying plate is sufficiently lightweight.

Since the width of the torque-carrying surface is increased in the above manner, no extra machining is necessary to correct inaccuracies in size when the plate is formed by blanking (to increase the width of the torque-carrying surface). Due to this, and the fact that the plate is sufficiently thin, it is possible to cut down on the manufacturing cost as well as the material cost.

Since the torque-carrying surface is symmetrical with respect to its longitudinal centerline, this surface can carry the brake torque stably from the time when the inner pad is brand-new until it is completely worn out.

If the point at which the brake torque acts on the disc moves from the point near its outer periphery toward its center, or vice versa, the length of the moment arm, and thus the surface pressure that acts on the torque-carrying surface, varies. Namely, If the point at which the brake torque acts changes with the progression of wear in such a way that the length of the moment arm changes, the brake torque that acts on the torque-carrying surface also changes. This results in unstable braking. Also, this may cause uneven damage to the torque-carrying surface, which will lead to the shortening of the life of the disc brake.

According to the present invention, the torque-carrying surface is symmetrical with respect to its longitudinal centerline, so that the average length of the moment arm remains unchanged form the time when the inner pad is brand-new until it is completely worn out. This minimizes fluctuation in torque.

BRIEF DESCRIPTION OF THE DRAWINGS

Other features and objects of the present invention will become apparent from the following description made with reference to the accompanying drawings, in which.

DETAILED DESCRIPTION OF THE PREFERRED EMBODIMENT

Figure 1A:
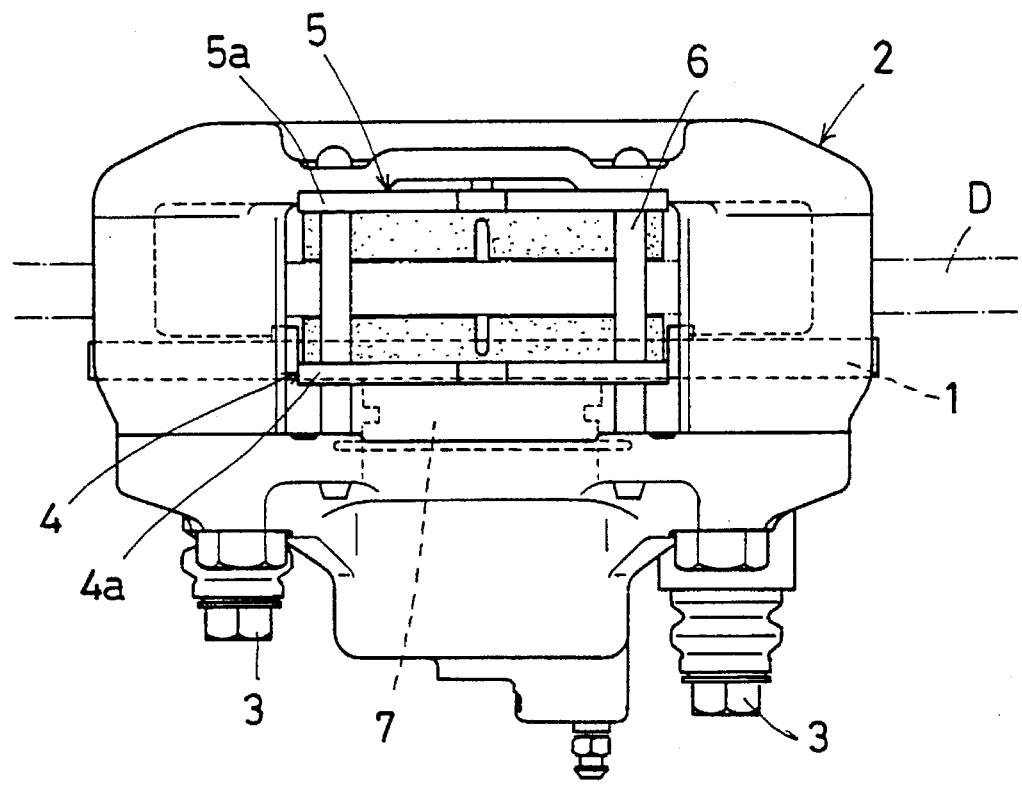
FIG. 1A is a plan view of an embodiment of a disc brake of the present invention.
Figure 1B:
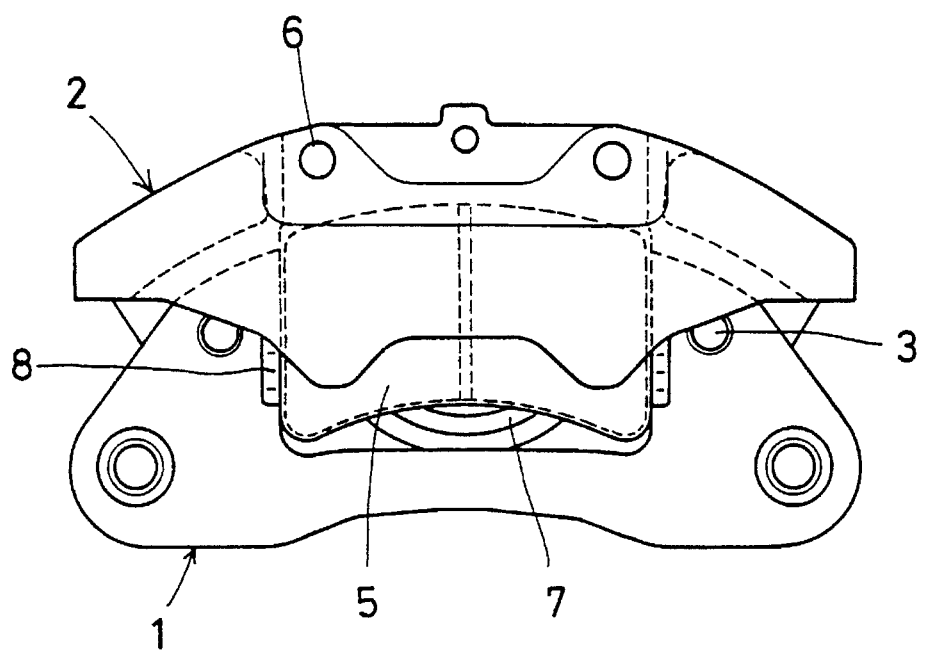
FIG. 1B is a view of the same as seen from an outer side.

Referring first to FIG. 1, the disc brake according to the present invention has a torque-carrying plate 1 formed by blanking a steel plate. This plate 1, which will be discussed later, is the point of the present invention.

The disc brake has a caliper 2 supported on a guide pin 3 fixed to the torque-carrying plate 1 so as to be slidable axially of the disc D. Pads 4 and 5 are provided opposite to each other on both sides of the disc D. They are hung on pad pins 6 axially extending through a window of the caliper 2 at the outer circumference of the disc D.

The inner pad 4, adapted to be biased by a brake piston 7, can slightly move in a tangential direction of the disc D, not restrained by the pad pins 6. During braking, its backing plate 4a abuts torque-carrying surfaces 1a of the torque-carrying plate 1.

The outer pad 5 has a backing plate 5a received in the window of the caliper 2 so that the torque produced during braking is carried by the caliper 2.

Figure 2:
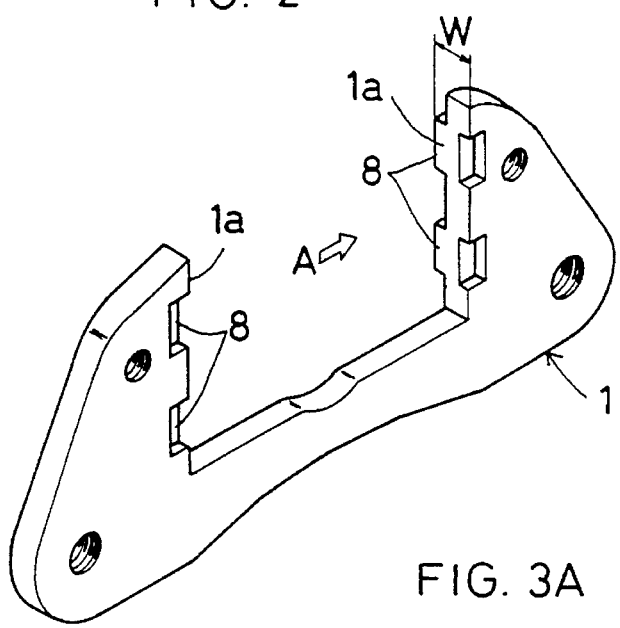
FIG. 2 is a perspective view of a torque-carrying plate embodying the invention.
Figure 3A:
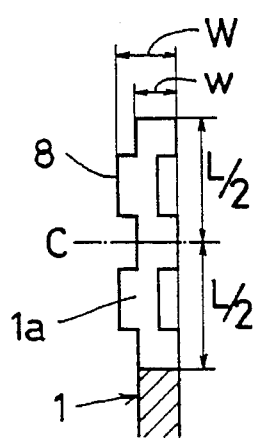
FIG. 3A is a view of the same as seen in the direction of arrow A in FIG. 2.

As shown in FIGS. 2 and 3, the torque-carrying surface 1a of the torque-carrying plate 1 is not straight, but has a zigzag section, so that the effective (axial) width W of each torque-carrying surface 1a is larger than the thickness w of the torque-carrying plate 1 (FIG. 3A). This zigzag pattern is formed by inwardly protruding portions 8.

The inwardly protruding portions 8 may be formed by half-shearing or by ordinary pressing. The protrusions 8 shown in FIGS. 2 and 3A are formed by the former method, while those shown in FIG. 3B are formed by the latter method.

Figure 3B:
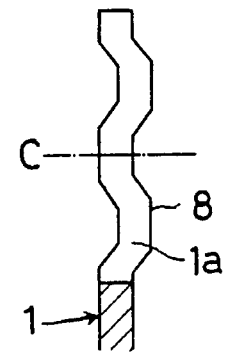
FIG. 3B shows the shape of a different torque-carrying surface.

As shown in FIGS. 3A and 3B, the torque-carrying surface 1a is symmetrical with respect to a centerline C that divides the surface (L in length) into an inner half portion (near the center of the disc; L/2 in length) and an outer half portion (near the circumference of the disc; L/2 in length).

Figure 4:
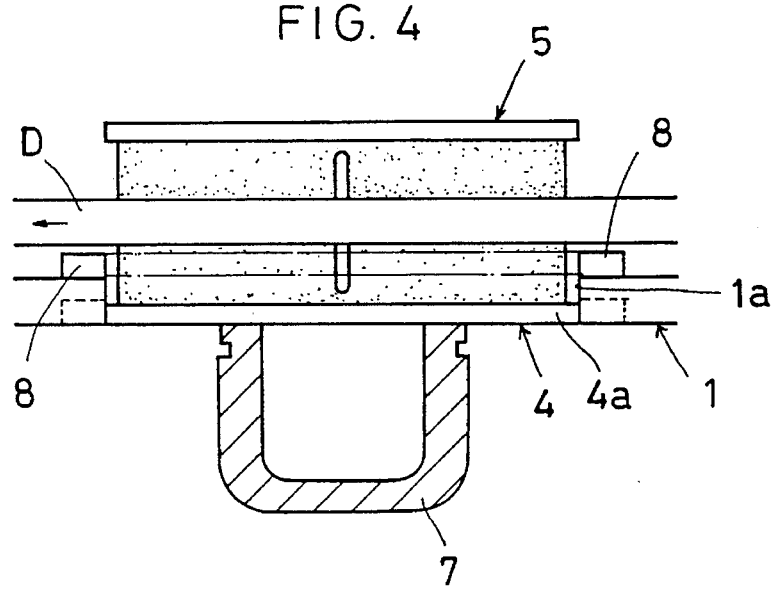
FIG. 4 is a partial plan view of the disc brake according to the present invention.

Since the torque-carrying plate 1 has the torque-carrying surface 1a having a width substantially larger than the thickness of the plate 1 itself, it can support the inner pad until it is completely worn out even if it is thinner than the value determined by conventional standards. Since the surface 1a is symmetrical with respect to centerline C, the center of the surface on which the torque is actually applied is always on the centerline C, from the time when the inner pad is brand-new until it is completely worn out (in FIG. 4, from the solid line to the dotted line). Namely, the average length of moment arm remains unchanged and the torque does not change.

It is possible to omit the pad pins 6 by engaging the inner pad in a guide groove formed in the torque-carrying plate in the axial direction of the disc. But forming such a guide groove in the thin torque-carrying plate is not only difficult, but will reduce the effective area of the torque-carrying surface and thus reduce the reliability and durability of the brake. Thus, it is preferable to hang the pads on the pad pins.

What is claimed is:

1. A disc brake, comprising:

a disc having an axis of rotation and an axial direction;

a brake piston;

an inner pad and an outer pad disposed opposite to each other on both sides of said disc, said inner and outer pads being adapted to be brought into frictional contact with said disc; and a fixed torque-carrying plate having a torque-carrying surface that has a longitudinal centerline, has a zigzag shape that comprises a plurality of protrusions extending in the axial direction of said disc, and is symmetrical with respect to the longitudinal centerline of said torque-carrying surface, said inner pad abutting said torque-carrying surface at least when said brake piston acts upon said inner pad such that said torque-carrying plate carries brake torque applied to said inner pad.

2. The disc brake of claim 1, wherein said fixed torque-carrying plate has a first width in the axial direction and a second width in the axial direction at said protrusions larger than said first width.

3. The disc brake of claim 2, wherein said second width at said axial protrusions defines a means for enabling said inner pad to be completely worn yet still have said inner pad abut said torque-carrying surface.

4. The disc brake of claim 1, wherein said torque-carrying surface being symmetrical with respect to the longitudinal centerline defines a means for maintaining torque along the longitudinal centerline throughout wear of said inner pad.

* * * * *